Sept. 26, 1961 W. F. BAILEY ET AL 3,002,048

STABILIZED IMAGE SCANNER

Filed Aug. 14, 1957 2 Sheets-Sheet 1

United States Patent Office 3,002,048
Patented Sept. 26, 1961

3,002,048
STABILIZED IMAGE SCANNER
William F. Bailey, Valley Stream, Bernard D. Loughlin, Huntington, and Ian G. MacWhirter, Great Neck, N.Y., assignors to Hazeltine Research Inc., Chicago, Ill., a corporation of Illinois
Filed Aug. 14, 1957, Ser. No. 678,190
7 Claims. (Cl. 178—5.2)

*General*

This invention relates to image scanners and particularly to image scanners of the type capable of scanning an image for developing electrical signals representative of the light values of successive elements of the image.

Image scanners of the type under consideration have found relatively wide use in the fields of facsimile data transmission and in television transmitters for transmitting program material recorded on film. In general, the electrical signals initially developed by such image scanners are relatively weak and, hence, provision is usually made for amplifying such signals by a substantial amount. Circuits for providing the requisite amounts of signal amplification are generally more susceptible to various sources of instability than is desired.

One form of an image scanner that is frequently utilized includes a flying spot scanner tube for scanning the image with a small beam of scanning light and a photomultiplier tube for converting the variations in scanning light from the image into corresponding electrical signal variations. The use of a photomultiplier-type tube having a large number of secondary emission electrodes provides a substantial amount of signal amplification as is desired. Such tubes, however, are more sensitive to undesired variations in operating potentials and the like and, hence, are less stable than is generally desired. Also, the intensity of scanning light from the flying spot scanner tube is subject to undesired variations resulting from variations in operating potentials and the like.

Image scanners have recently been found to be extremely useful in an electronic color film previewer of the type described in copending application Serial No. 662,199, filed May 28, 1957, of Bailey, Loughlin, and Page, entitled "Electronic Previewer for Negative Color Film." Such a color film previewer is an electronic apparatus into which a negative color film specimen may be placed and which is effective to develop therefrom a positive color image corresponding to the positive image that would have been produced had the negative film been printed and the exposed positive processed in the usual photographic manner. In such apparatus electrical signals representative of the red, green, and blue components of the negative color image are developed by means of what, in effect, amounts to three image scanners of the type presently being considered. These electrical signals are subsequently processed in a manner analogous to the photographic processing of the positive color film to produce on the display screen of a three-color cathode-ray tube the desired positive image. Such a machine enables the operator to determine the timing data, that is, the exposure and color balance of the photographic printing light, that will be required in the photographic process. This determination is made by adjustment of calibrated gain-control knobs of the electronic apparatus until the reproduced positive image assumes the desired appearance. In this type of apparatus the image scanners must possess a high degree of stability in order that the calibrations of the gain-control knobs may be accurately correlated with the various printing conditions in the photographic printer.

It is an object of the invention, therefore, to provide a new and improved image scanner having an improved degree of stability.

It is another object of the invention to provide a new and improved image scanner wherein the over-all signal gain, including the intensity of the scanning light source, may be held substantially constant over prolonged periods of operation even though a very large amount of signal gain is provided in the scanner.

It is a further object of the invention to provide a new and improved image scanner for use in an electronic previewer for negative color film for insuring reliable calibrations for the controls thereof.

In accordance with the invention, a stabilized image scanner comprises scanning means including a scanning light source and a photoelectric pickup device for developing from an image electrical signals representative of the light values of successive elements of the image and for periodically developing electrical signals representative of the intensity of the scanning light. The image scanner also includes means for supplying a reference voltage and means for setting one portion of the light sensitive-representative signals at a stable voltage with respect to the reference voltage. The image scanner further includes means for comparing the amplitude of the periodic source-representative electrical signals with the reference voltage for developing a control signal representative of the difference therebetween, and means responsive to the control signal for controlling the signal gain of the scanning means for stabilizing the product of scanning light intensity and signal gain of the scanning means.

For a better understanding of the present invention, together with other and further objects thereof, reference is had to the following description taken in connection with the accompanying drawings, and its scope will be pointed out in the appended claims.

Referring to the drawings.

*Description of image scanner*

Figure 1:
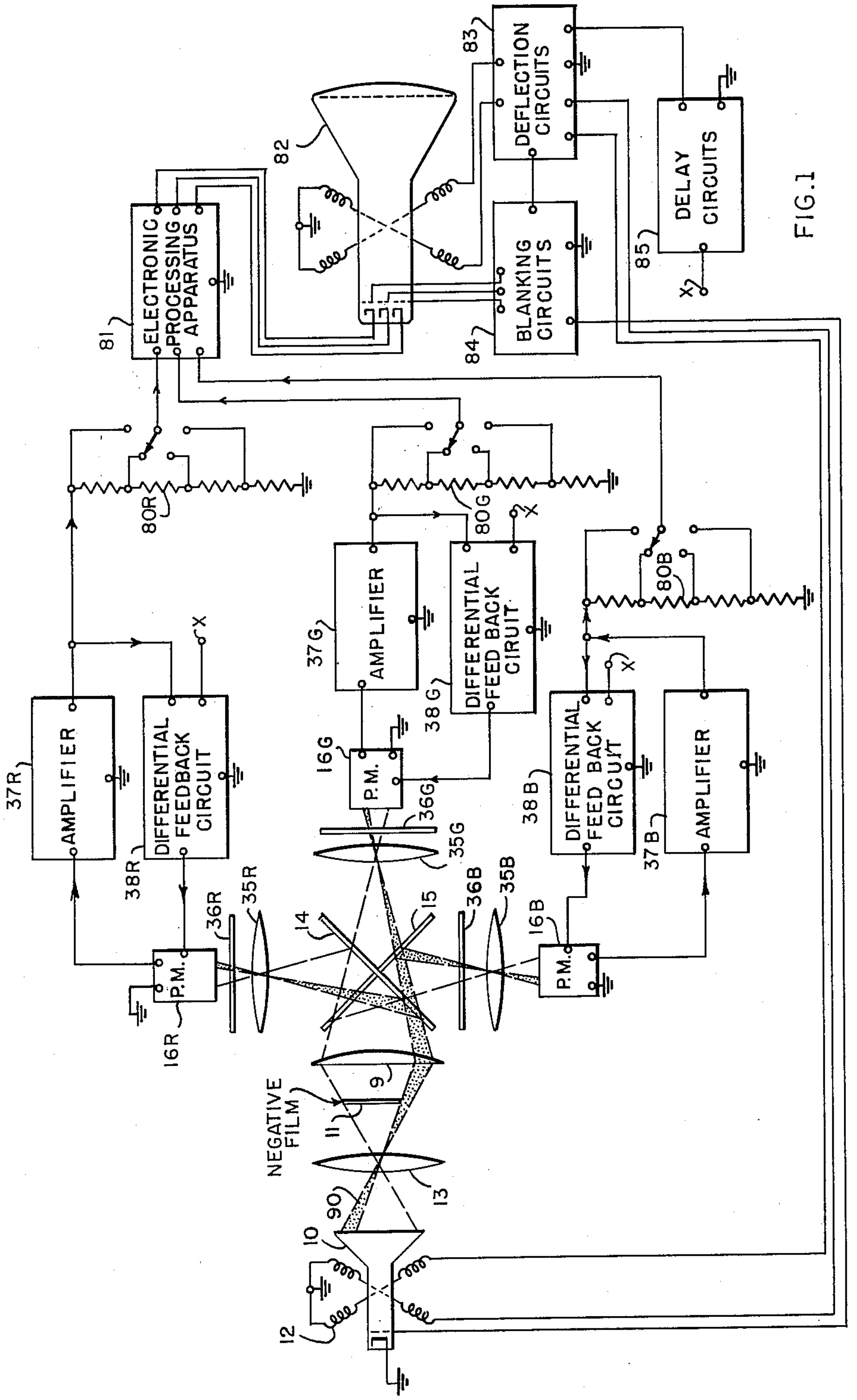
FIG. 1 is a circuit diagram of a representative embodiment of an electronic previewer for negative color film including a representative embodiment of an image scanner constructed in accordance with the present invention.

Referring to FIG. 1 of the drawings, there is shown a representative embodiment of an electronic previewer for negative color film including a representative embodiment of an image scanner constructed in accordance with the present invention. The image scanner of the present invention is illustrated in this representative environment of a color film previewer because it represents a particularly critical environment in which a high degree of operating stability is required.

Considering now the stabilized image scanner embodiment of FIG. 1, such image scanner includes scanning means including a light source and a photoelectric pickup device for developing from an image electrical signals representative of the light values of successive elements of the image and for periodically developing electrical signals representative of the intensity of the light source. The light source portion of such scanning means may include, for example, a flying spot scanner 10 for scanning an image, in this case a negative film image 11, with a small beam of scanning light which also periodically overscans the film image 11 so that periodic samples of the scanning light by-pass the image. Such flying spot scanner 10 is of the cathode-ray tube type wherein an electron beam is generated and is rapidly scanned back and forth across the phosphor screen in a raster pattern to develop a corresponding moving spot of light on the phosphor screen. Such scanning of the electron beam is accomplished by means of deflection coils 12.

The spot of light on the face of the flying spot scanner 10 is then focused by a lens 13 onto the negative film image 11. The light emerging from the other side of the film 11 is passed through a converging lens 9 and is split up into red, green, and blue components by a pair of crossed dichroic mirrors 14 and 15.

In order to utilize such red, green, and blue light components, the image scanner also includes photoelectric means responsive to the scanning light from the film image 11 for developing the desired image-representative electrical signals and for also developing periodic electrical pulses having amplitudes representative of the intensity of the scanning light. Actually, because the system in which the invention is used is concerned with three component colors of the scanning light, the image scanner includes three such photoelectric means which may, for example, take the form of photomultiplier tubes 16R, 16G, and 16B. A representative one of these photomultiplier tubes, for example the red photomultiplier tube 16R, is shown in more detail in FIG. 2 and includes a light-sensitive cathode 17 and a plurality of secondary-emission electrodes 18–27, inclusive, for amplifying the electrical signals generated by the cathode 17. The photomultiplier tube 16R of FIG. 2 also includes a collector electrode 28 and a load impedance 29 across which the electrical output signals are developed. In order to provide operating potentials for the secondary-emission electrodes 18–27, inclusive, a tapped potential divider 30 is connected to such electrodes and to a source of operating potential —B by way of resistors 31, 32, and 33.

Returning now to FIG. 1, the red component of the scanning light is directed onto the photosensitive cathode of the red photomultiplier tube 16R by way of a lens 35R and a red optical filter 36R. Similarly, the green component of the scanning light is directed onto the photosensitive cathode of the green photomultiplier 16G by way of a lens 35G and a green filter 36G. Likewise, the blue component is supplied to the blue photomultiplier tube 16B by way of a lens 35B and a blue filter 36B. Each of the photomultiplier tubes 16G and 16B may be identical in construction to that shown in FIG. 2 for the red photomultiplier tube 16R.

The scanning means portion of the image scanner also includes means for amplifying the electrical signals including the reference pulses developed by the photoelectric devices. In the case where photomultiplier-type pickup devices are utilized, part of this desired amplification is provided by the secondary-emission electrodes of the device. Additional amplification may be provided by additional amplifier 37R, 37G, and 37B, coupled to the outputs of the photomultiplier tubes 16R, 16G, and 16B, respectively.

The image scanner of FIG. 1 also includes means responsive to the periodic source-representative electrical signals, that is, the reference pulses, for stabilizing the product of source light intensity and signal gain of the scanning means. In the case of the present apparatus where three component colors are involved, such apparatus should include three such stabilizing means as represented by the differential feedback circuits 38R, 38G, and 38B of FIG. 1. These feedback circuits are shown as feeding back control signals to the photomultiplier tubes 16R, 16G, and 16B, but may instead, or in addition thereto, also feed back to the amplifiers 37R, 37G, and 37B or, in the case where a three-gun three-color flying spot scanner tube is used, may feed back directly to the control electrodes thereof for controlling the intensity of the corresponding components of the scanning light. Where a single-gun flying spot scanner tube is used as shown in FIG. 1, then the three control signals may also be combined to form a composite control signal which may then be fed back to the single control electrode of the flying spot scanner tube to supplement the other feedback connections.

Figure 2:
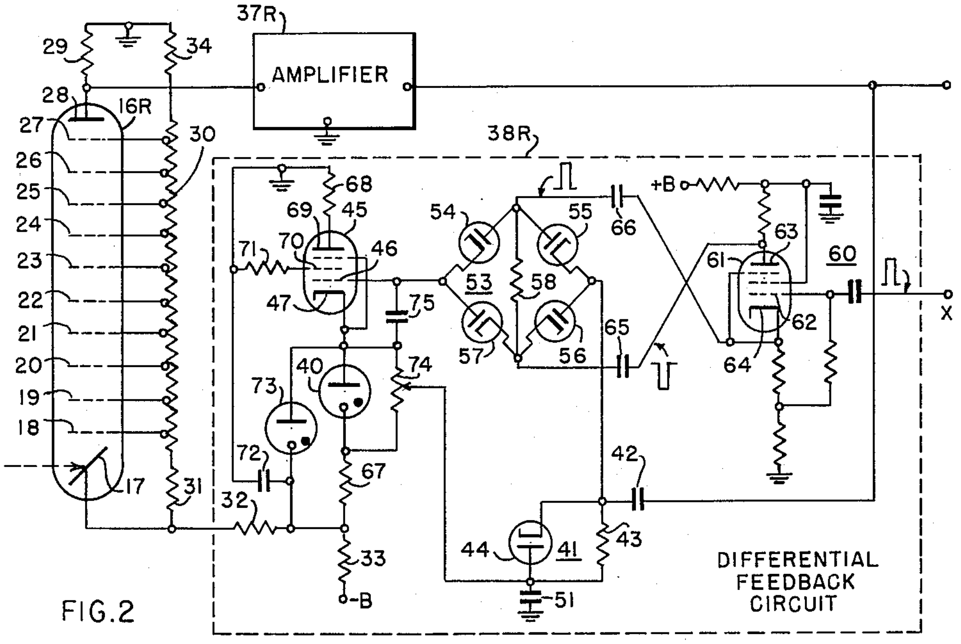
FIG. 2 is a circuit diagram showing in detail the construction of a portion of the image scanner of FIG. 1.

A representative one of the differential feedback circuits, namely the red circuit 38R, is shown in more detail in FIG. 2. As there indicated, such circuit includes means for supplying a direct-current reference voltage, which means is indicated generally by a voltage reference tube 40. The circuit 38R also includes means for comparing the amplitude of the amplified pulses which are representative of the intensity of the red component of the scanning light with the reference voltage developed by the tube 40 for developing a control signal representative of the difference therebetween. Such comparing means includes means for setting the base of the amplified pulses as supplied by the amplifier 37R to a stable value of direct-current voltage. Such level-setting means is indicated generally by a direct-current restorer circuit 41 which includes a condenser 42, a resistor 43, and a diode 44.

The comparing circuit means also includes an electron-discharge device, represented by an electron tube 45, having a first electrode 46 to which the level-set or base-stabilized pulses are applied and a second electrode or cathode 47 to which the reference voltage developed by the tube 40 is applied. The base-stabilized pulses are supplied to the control electrode 46 by way of a gated electronic switch 53 which may include four diodes 54, 55, 56, and 57 connected in the form of a bridge circuit. A stabilizing resistor 58 is connected across one part of the bridge.

The electronic switch 53 may be gated either by external gating pulses which are synchronized with the scanning action of the flying spot scanner 10 or else may be gated by way of the periodic pulses appearing in the video signal itself. External gating is shown in FIG. 2 and to this end the feedback circuit 38R includes a phase-splitting circuit 60 including the electron tube 61. External gating pulses developed by the flyback action in the deflection circuits 83 and delayed in time by a delay circuit 85 are applied to a control electrode 62 of tube 61 by way of input terminal X whereupon gating signals of opposite polarities appear at the anode 63 and the cathode 64. These gating signals are coupled by way of coupling condensers 65 and 66 to the electronic switch 53 and serve to render such switch conductive during the occurrence of the periodic source-representative pulses. Where gating by way of the source-representative reference pulses is instead desired, the input terminal X would instead be coupled by way of an additional amplifier stage to the output of amplifier 37R.

In order to supply operating potentials to the electron tube 45, such tube is connected between the source of operating potential —B and chassis-ground by way of resistors 33, 67, and 68, the latter being connected to the anode 69 of tube 45. Operating potential for screen electrode 70 is provided by way of a resistor 71 and a filter condenser 72. The cathode 47 is coupled to the resistor 33 by way of a voltage regulator tube 73 which provides a desired low-impedance value between these two points.

In order to set the pulse base to an accurately known direct-current voltage value, a voltage divider 74 is coupled across the voltage reference tube 40 and serves to provide the reference potential for the direct-current restorer circuit 41. The video components supplied to the restorer circuit 41 are bypassed to ground by way of a large value bypass condenser 51. A small integrating condenser 75 is provided between the control electrode 46 and the voltage divider 74 for maintaining the direct-current voltage at the control electrode 46 relatively constant at a level corresponding to the peak level of the periodic pulses.

The feedback circuit 38R of FIG. 2 also includes means responsive to the control signal, more specifically, the variations in the control current developed by the tube 45, for varying the gain of at least part of the amplifying means of the image scanner in an inverse manner for stabilizing the product of scanning light intensity and signal gain of the scanner. As indicated in FIG. 2, this circuit means may take the form of means coupling the electron-discharge path of the tube 45 in shunt with at least part of the secondary-emission electrodes 18–27, inclusive, so that variations in the control current of tube 45 will vary the loading on the operating potential supply means represented by the source −B and, hence, the value of the operating potential supplied to the secondary-emission electrodes 18–27, inclusive. This, in turn, varies the signal gain of the photomultiplier tube 16R to compensate for any reduction of gain therein or in the amplifier 37R or in the intensity of the light from the flying spot scanner tube 10.

Returning now to FIG. 1 of the drawings, each of the defferential feedback circuits 38G and 38B in the green and blue signal channels may be identical in construction to the circuit 38R which was explained in detail in FIG. 2. In this manner the light intensity times signal gain product in each of the red, green, and blue signal channels is accurately stabilized. The resulting red, green, and blue representative electrical signals in the three channels are then supplied to accurately calibrated gain-control means represented by adjustable voltage dividers 80R, 80G, and 80B. The calibrations on these gain controls correspond to different printing conditions in the photographic printing process.

The red, green, and blue electrical signals are then supplied to electronic processing apparatus 81 which may take the form of any of the different embodiments of apparatus described in the mentioned copending application of Bailey, Loughlin, and Page. Such apparatus 81 is effective to process the electrical signals to include accurate simulations of the nonlinearities and dye cross-couplings in the photographic processing of the positive color film. Such processed signals are then supplied to a three-color cathode-ray tube 82 which is effective to produce on the display screen thereof the desired positive image corresponding to the image obtainable from the negative film 11 by means of photographic processing.

The scanning action of the electron beams of both the flying spot scanner tube 10 and the three-color cathode-ray tube 82 are accurately held in synchronism with each other by supplying the requisite scanning currents for the deflection coils from a common set of deflection circuits 83. Also, each of the tubes 10 and 82 is blanked out or turned off during the retrace intervals of the electron beams by means of blanking pulses developed by blanking circuits 84.

As indicated in FIG. 1, the image scanner may take the form of a flying spot scanner system using fixed photoelectric pickup devices. As an alternative, the flying spot scanner tube 10 could be replaced by a fixed light source which is effective to expose the whole surface of the negative film 11, in which case the photomultiplier tubes 16R, 16G, and 16B could be replaced by scanning-type image pickup tubes such as iconoscopes or image orthicons. In this case, the periodic pulses representative of the intensity of the source light could be developed by again having some source light by-pass the negative film and develop a reference exposure along one edge of the image on the image tube mosaics.

For the case of a flying spot scanner type of scanning system, some difficulty may be encountered in getting a sample of the source light to by-pass the negative film 11. This depends on the physical construction of the apparatus and, where necessary, a suitable prism arrangement may be utilized to more readily enable a portion of source light to by-pass the negative film 11. For example, a simple prism having a cross-section in the form of a parallelogram could be placed adjacent one edge of the display screen of the flying spot scanner tube 10 and extended sufficiently far to one side of the tube 10 to enable the desired sample of the light to by-pass the negative film 11.

*Operation of image scanner*

Considering now the operation of the stabilized image scanner just described for the representative case where the image scanner is utilized in a negative color film previewer, the negative color film specimen to be scanned is positioned as indicated by the film specimen 11 of FIG. 1. The scanning spot on the face of the flying spot scanner tube 10 scans back and forth so that the resulting narrow beam of scanning light which is focused by the lens 13 on the film 11 likewise scans back and forth across the film 11. The scanning of the spot on the tube 10 is adjusted so that the spot overscans the image so that a small sample of the scanning light, as indicated by the cross-hatched rays 90, by-passes the film specimen 11 at the beginning of each line scan of the spot. The scanning light from the tube 10 is wide band in nature containing substantial amounts of red, green, and blue light components which, for the case of the light which passes through the film 11, are modulated in accordance with the densities of the color dyes of the film 11. The scanning light emerging from the film 11 as well as that which by-passes the film 11 is then split up into its component red, green, and blue components by the crossed dichroic mirrors 14 and 15. Further separation of the component colors is afforded by the red, green, and blue filters 36R, 36G, and 36B.

Figure 3:
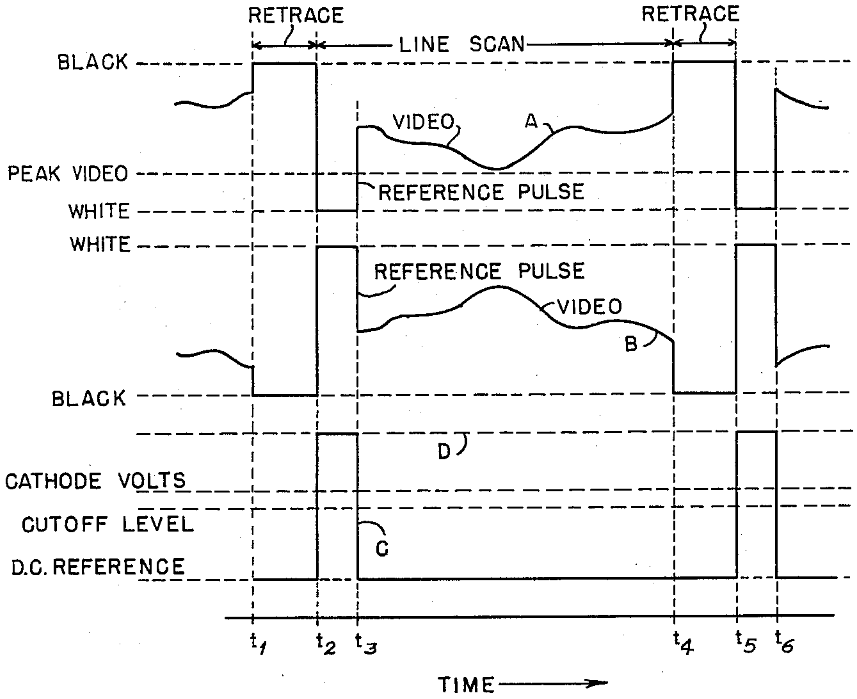
FIG. 3 is a graph representing signals developed at various points in the FIG. 2 circuit and used in explaining the operation thereof.

The nature of the electrical signals appearing at the outputs of each of the photomultiplier tubes 16R, 16G, and 16B may be better understood by referring to the wave forms of FIG. 3 which, for sake of an example, can be considered as being the wave forms in the red color-signal channel. Curve A of FIG. 3 indicates the electrical signal appearing at the output of the red photomultiplier tube 16R. During the retrace interval $t_1$—$t_2$ of the electron beam of the tube 10, such tube is blanked out by blanking pulses from the blanking circuit 84. Hence, the electrical signal level during this interval corresponds to an input black level to the photomultiplier tube. During the initial portion of the line-scan interval, namely portion $t_2$—$t_3$, the light from the flying spot scanner tube 10 by-passes the negative film 11 so that the input to the crossed dichroic mirrors 14, 15 corresponds to a maximum value equal to or greater than white or, for the case of the photomultiplier tube 16R, the input thereto corresponds to a maximum red. This scanning light which by-passes the film 11 thus serves to generate a reference pulse of amplitude determined only by the intensity of the red component of the scanning light generated by the tube 10. As the beam of scanning light subsequently scans across the film 11 during the time interval $t_3$—$t_4$, the electrical signal level at the output of the photomultiplier tube 16R assumes various values depending on the density of the various elements in the scanned line of the film to the red component of the scanning light. The tube 10 is then blanked out during the next retrace interval and the cycle of operation repeats itself for the next adjacent line of the film image. Thus, the amplitude of the periodic reference pulses generated at the beginning of each line scan and appearing at the output of the red photomultiplier tube 16R is determined by the intensity of the red component of the scanning light developed by the tube 10. Similarly, the video levels occurring during the subsequent scanning of the film 11 are representative of the various values of the red component emerging from the film 11. The signals appearing at the outputs of the green and blue photomultiplier tubes 16G and 16B are similar in nature to those appearing at the output of the red photomultiplier tube 16R, except that the particular amplitude values are determined by the green and blue components of the scanning light.

The amplifier 37R in the red signal channel provides an odd number of phase inversions so that the electrical signal appearing at the output thereof is inverted in polarity as indicated by curve B of FIG. 3. Whether such phase inversion is to be provided depends on the particular design of the differential feedback circuit 38R. Such feedback circuit may be equally as readily designed to operate on either negative-going or positive-going signals. For sake of an example, the circuit shown is designed to operate on positive-going signals. Similar considerations apply for the amplifiers 37G and 37B in the green and blue channels.

The red, green, and blue representative signals are then supplied by way of calibrated gain-control voltage dividers 80R, 80G, and 80B to the electronic processing apparatus 81. As mentioned, the apparatus 81 is effective to accurately simulate the photographic processing of the positive film including simulations of the nonlinearities and dye cross-coupling effects. The processed signals are then supplied to the red, green, and blue electron guns of the three-color cathode-ray tube 82 and, hence, produce the desired positive image on the display screen thereof. The electronic previewer apparatus including the image scanning system, the circuits of the electronic processing apparatus 81, and the cathode-ray tube 82 is constructed to provide an odd number of phase inversions in each signal channel so that the conversion from a negative to a positive image in the photographic process is simulated. Because of this phase inversion, the periodic reference pulses representative of the unmodulated scanning light intensity correspond to a black or blacker-than-black level in the reproduced image and, hence, have no undesired effects on the appearance thereof, that is, they do not appear in the reproduced image.

Assuming that the scanning light intensity from the tube 10 and the signal gains up to the calibrated gain-control voltage dividers 80R, 80G, and 80B are constant and capable of producing maximum output signal levels which are proportional to the maximum intensities of the component colors of a standard printing light used in the photographic printing process, then the voltage dividers 80R, 80G, and 80B may be calibrated directly in terms of corresponding adjustments in the intensities of the red, green, and blue components of the photographic printing light. In this manner adjustments in the color balance and exposure of the photographic printing light may be simulated by adjusting the calibrated knobs of the voltage dividers 80R, 80G, and 80B. Thus, these knobs may be adjusted until the reproduced positive image on the cathode-ray tube 82 takes on the desired appearance whereupon the dial settings of the voltage dividers 80R, 80G, and 80B indicate the corresponding modification required for the photographic printing light in order to obtain an actual color film positive having the same appearance. In order for the calibrations of the voltage dividers 80R, 80G, and 80B to be accurately correlated with the different printing conditions of the photographic printing light, the product of scanning light intensity and signal gain for each component color and each signal channel in the electronic image scanner of FIG. 1 must be held accurately constant and not allowed to undergo any variations, otherwise the calibrations of the voltage dividers 80R, 80G, and 80B will be upset and the timing data indicated by their dial settings will no longer be reliable.

In order to hold the product of scanning light intensity and signal gain for each of the component colors and signal channels constant, an image scanner in accordance with the present invention includes a special self-regulating feedback arrangement. Actually, for convenience, the image scanner of FIG. 1 can be visualized as being made up of three separate image scanners, one for each of the red, green, and blue color components. This will be more readily apparent when it is realized that the single flying spot scanner tube 10 producing a wide-band form of scanning light could instead be replaced by three individual red, green, and blue flying spot scanners whose output scanning beams are brought together to form a single composite scanning beam. Consequently, the feedback regulation for each color channel may, from a practical standpoint, be considered independently of the feedback regulation for the other two channels. Considering, therefore, the case of the red component of the scanning light and the red signal channel, the first problem that is encountered is to find something for the feedback circuit to operate on which is indicative of both the intensity of the red scanning light component and the signal gain, both optical and electrical, in the red signal channel. Such an indication is provided by the periodic reference pulses generated by the scanning light which by-passes the negative film 11. As a result, the present invention includes feedback means which operate on these periodic reference pulses to develop a control signal which will adjust either or both of the light intensity and the signal gains in a compensating manner should any undesired variations occur.

One form which the feedback means and control of the product of scanning light intensity and signal gain may take is indicated in detail in FIG. 2, and the principles of the present invention will be better understood by a detailed consideration of the operation thereof. The photomultiplier tube 16R of FIG. 2 is responsive to the red component of the scanning light to develop across its load resistor 29 an electrical signal of the form indicated by curve A of FIG. 3. This signal is translated by the amplifier 37R and appears at the output thereof with a wave form as indicated by curve B of FIG. 3. This signal indicated by curve B is supplied to the differential feedback circuit 38R and, in particular, to the direct-current restorer circuit 41 thereof. This circuit 41 serves to set the base or black level of the curve B signal at an accurately known value of direct-current voltage, which voltage is supplied by the voltage divider 74 which, in turn, is connected across the voltage reference tube 40.

External gating pulses are supplied by way of the input terminal X to the phase-splitter circuit 60 and consequently appears with the same polarity at the cathode 64 and with opposite polarity at the anode 63. These pulses are delayed in time relative to the retrace intervals so that they occur during the occurrence of the light source representative reference pulses. These opposite polarity gating pulses are then supplied to the electronic switch 53 and serve to render the switch 53 conductive during the occurrence of the reference pulses representative of scanning light intensity. The coupling condensers 65 and 66 together with the diodes of the electronic switch 53 perform a self-biasing action so that the direct-current potentials developed across the condensers 65 and 66 are of the proper polarity to render the switch 53 nonconductive in the absence or in between the occurrence of the reference pulses. As a result of the switching action of the switch 53, there tends to appear at the control electrode 46 of the tube 45 an electrical signal as indicated by the wave form of curve C of FIG. 3. As is indicated by curve C, this signal includes only the reference pulses, the pulse base of which is accurately set to a known value of direct-current voltage. Actually, the presence of the integrating condenser 75 and the action of the electronic switch 53 serve to charge up and hold the voltage at the control electrode 46 at a value corresponding to the peak value of the reference pulses. This value is indicated by level D of FIG. 3.

At the same time, there is applied to the cathode 47 of the tube 45 a stable direct-current reference voltage developed by the voltage reference and regulator tubes 40 and 73. The use of the voltage reference tube 40 and the potentiometer 74 accurately sets the control electrode 46 to cathode 47 voltage, in the absence of any reference pulses, to a known value which is preferably selected to bias the tube 45 beyond cutoff. Because of the switching action of the switch 53, this voltage is only applied when the switch 53 is conductive. A small condenser 75 is utilized, however, to maintain this bias voltage during the nonconductive intervals of the switch 53.

The effect of each periodic reference pulse appearing at the top of the restorer circuit 41 is to periodically charge the integrating condenser 75 to a direct-current value such that the voltage level at the control electrode 46 corresponds to the peak level of such pulse. This peak pulse level is then maintained during the subsequent portion of the trace interval by the condenser 75. As a result, an average current flow results in the tube 45, the magnitude of which is determined by the magnitude or peak-to-peak amplitude of the reference pulses. This average current flow of the tube 45 may then be used to control the gain of the photomultiplier tube 16R. This is done by placing the current path of the tube 45 in parallel with the resistor 30 supplying the operating voltages to the secondary emission electrodes 18–27, inclusive, of the tube 16R and then connecting this parallel combination to the source of operating potential —B by way of a common series impedance represented by the resistor 33. Actually, a separate resistor 33 need not be utilized where the source of operating voltage —B has sufficient internal impedance. Variation of the signal gain of the tube 16R is obtained because any change in the average current flow through the tube 45 will change the voltage drop across the resistor 33 and, hence, will change the value of the operating voltage supplied to the resistor 30. Changing the operating voltages of the secondary emission electrodes 18–27, inclusive, of course changes the gain of the photomultiplier tube 16R, the gain decreasing if the operating voltage is decreased. The condenser 72 is of relatively large value and serves to smooth out any ripple component resulting from the periodic charging of the integrating condenser 75 so that only the average variations in the direct-current voltage are supplied to the tube 16R. A resistor 32 may be included to provide suitable attenuation to make the feedback loop stable.

To better understand the operation, assume that either the intensity of the red component of the scanning light decreases or that the signal gain of the photomultiplier tube 16R decreases. Then, the amplitude of the periodic reference pulses is decreased so that the average current flow through the tube 45 decreases. This, in turn, decreases the loading on the source of operating potential —B and increases the value of operating potential supplied to the secondary-emission electrodes of the photomultiplier tube 16R. This, in turn, increases the gain of the photomultiplier tube 16R which then compensates for the decrease due either to a decrease in the intensity of the red component of the scanning light or a decrease in the gain of the tube 16R or, for that matter, a decrease in gain in the amplifier 37R. In this manner the product of scanning light intensity and signal gain for the red signal portion of the image scanner is held accurately constant.

A particular feature of the feedback system shown in FIG. 2 is that the operation of the system and the product of scanning light intensity and signal gain are substantially independent of the parameters of any of the tubes in the differential feedback circuit 38R except for the voltage reference tube 40 which inherently possesses a high degree of stability. In particular, the operation of the feedback system is not affected by change in operating characteristics such as signal gain of the tube 45 with age and the like. This is because the control current is determined by comparing the reference pulse amplitude with a reference direct-current voltage so that only relative changes in these two values will affect the control current and, hence, the control effect on the photomultiplier tube 16R.

The feedback control system for the green and blue signal channels operates in the same manner as that just described for the red channel.

Another problem that should be mentioned briefly that may occur in the case of a color film previewer is that in the case of the blue signal channel the reference pulse amplitude may be very much greater than the peak video amplitude and such departure may be greater than is desired. This is because the typical negative color film affords a fairly substantial amount of attenuation for the blue component of the scanning light so that the blue video will be substantially attenuated relative to the reference pulse light which by-passes the film 11. This may be corrected for by inserting an appropriate filter in the path of the scanning light which by-passes the negative film 11. Such a filter should have approximately the same color balance as the color film negative but should be of lower density. In other words, the characteristic of this filter should be such that it attenuates the blue component of the scanning light relative to the red and green components so that the blue reference pulses are more nearly in line with the attenuated blue video.

From the foregoing description of the invention, it will be apparent that an image scanner constructed in accordance with the principles of the present invention provides an improved degree of stability and is less subject to undesired variations during the course of operation of the apparatus.

While there has been described what is at present considered to be the preferred embodiment of this invention, it will be obvious to those skilled in the art that various changes and modifications may be made therein without departing from the invention, and it is, therefore, aimed to cover all such changes and modifications as fall within the true spirit and scope of the invention.

What is claimed is:

1. A stabilized image scanner comprising: scanning means including a scanning light source and a photoelectric pickup device for developing from an image electrical signals representative of the light values of successive elements of the image and for periodically developing electrical signals representative of the intensity of the scanning light; means for supplying a reference voltage; means for setting one portion of the light intensity-representative signals at a stable voltage with respect to the reference voltage; means for comparing the amplitude of the periodic source-representative electrical signals with the reference voltage for developing a control signal representative of the difference therebetween; and means responsive to the control signal for controlling the signal gain of said scanning means for stabilizing the product of scanning light intensity and signal gain of the scanning means.

2. A stabilized image scanner comprising: means for scanning an image with a small beam of scanning light which also periodically overscans the image so that periodic samples of the scanning light by-pass the image; photoelectric means responsive to the scanning light from the image for developing electrical signals representative of the light values of successive elements of the image and responsive to the image-by-passed scanning light for developing periodic electrical pulses having amplitudes representative of the intensity of the scanning light; means for amplifying the electrical signals including the pulses; means for supplying a reference voltage; means for the setting one portion of the light intensity-representative signals at a stable voltage with respect to the reference voltage; means for comparing the amplitude of the amplified pulses with the reference voltage for developing a control signal representative of the difference therebetween; and means responsive to the control signal for varying the gain of the amplifying means in an inverse manner for stabilizing the product of scanning light intensity and signal gain of the scanner.

3. A stabilized image scanner comprising: a flying-spot scanner for scanning an image with a small beam of scanning light which also periodically overscans the image so that periodic samples of the scanning light by-pass the image; photoelectric means responsive to the scanning light from the image for developing electrical signals representative of the light values of successive elements of the image and responsive to the image-by-passed scanning light for developing periodic electrical pulses having amplitudes representative of the intensity of the scanning light; means for amplifying the electrical signals including the pulses; means for supplying a reference voltage; means for setting one portion of the light intensity-representative signals at a stable voltage with respect to the reference voltage; means for comparing the amplitude of the amplifier pulses with the reference voltage for developing a control signal representative of the difference therebetween; and means responsive to the control signal for varying the gain of the amplifying means in an inverse manner for stabilizing the product of scanning light intensity and signal gain of the scanner.

4. A stabilized image scanner comprising: means for scanning an image with a small beam of scanning light which also periodically overscans the image so that periodic samples of the scanning light by-pass the image; a photomultiplier tube including a light-sensitive cathode responsive to the scanning light from the image for developing electrical signals representative of the light values of successive elements of the image and responsive to the image-by-passed scanning light for developing periodic electrical pulses having amplitudes representative of the intensity of the scanning light and including a plurality of secondary-emission electrodes for amplifying the electrical signals including the pulses; means for supplying a reference voltage; means for setting one portion of the light intensity-representative signals at a stable voltage with respect to the reference voltage; means for comparing the amplitude of the amplifier pulses with the reference voltage for developing a control signal representative of the difference therebetween; and means responsive to the control signal for varying the gain of the amplifying means in an inverse manner for stabilizing the product of scanning light intensity and signal gain of the scanner.

5. A stabilized image scanner comprising: means for scanning an image with a small beam of scanning light which also periodically overscans the image so that periodic samples of the scanning light by-pass the image; photoelectric means responsive to the scanning light from the image for developing electrical signals representative of the light values of successive elements of the image and responsive to the image-by-passed scanning light for developing periodic electrical pulses having amplitudes representative of the intensity of the scanning light; means for amplifying the electrical signals including the pulses; means for supplying a direct-current reference voltage; means for setting the base of the amplified pulses to a stable value of direct-current voltage; an electron-discharge device having one electrode responsive to the peak amplitude of the base-stabilized pulses and another electrode responsive to the reference voltage for comparing the amplitude of these pulses with the reference voltage for developing a control current representative of the difference therebetween; and means responsive to variations in the control current for varying the gain of the amplifying means in an inverse manner for holding constant the product of scanning light intensity and signal gain of the scanner.

6. A stabilized image scanner comprising: means for scanning an image with a small beam of scanning light which also periodically overscans the image so that periodic samples of the scanning light by-pass the image; a photomultiplier tube including a light-sensitive cathode responsive to the scanning light from the image for developing electrical signals representative of the light values of successive elements of the image and responsive to the image-by-passed scanning light for developing periodic electrical pulses having amplitudes representative of the intensity of the scanning light and including a plurality of secondary-emission electrodes for amplifying the electrical signals including the pulses; means for supplying operating potentials to the secondary-emission electrodes; means for supplying a direct-current reference voltage; means for setting the base of the amplified pulses to a stable value of direct-current voltage; an electron-discharge device having one electrode responsive to the peak amplitude of the base-stabilized pulses and another electrode responsive to the reference voltage for comparing the amplitude of these pulses with the reference voltage for developing a control current representative of the difference therebetween; and means coupling the electron-discharge path of the device in shunt with at least part of the secondary-emission electrodes so that variations in the control current vary the loading on the operating potential supply means and, hence, the value of operating potential supplied to the secondary-emission electrodes for stabilizing the product of scanning light intensity and signal gain of the scanner.

7. A stabilized image scanner for use in an electronic previewer for negative color film comprising: scanning means including a scanning light source and a photoelectric pickup device for developing from a negative color film image electrical signals representative of the light values of respective color components of successive elements of the image and for periodically developing electrical signals representative of the intensity of the scanning light; means for supplying a reference voltage; means for setting one portion of the light intensity-representative signals at a stable voltage with respect to the reference voltage; means for comparing the amplitude of the light intensity-representative signals with the reference voltage for developing a control signal representative of a difference therebetween; and negative feedback means responsive to the control signal for developing a control signal dependent on variations in amplitude thereof; and negative feedback means responsive to the control signal for stabilizing the overall signal gain of the scanning means, thereby insuring reliable calibrations for the controls of the electronic previewer.

References Cited in the file of this patent

UNITED STATES PATENTS

| | | |
|---|---|---|
| 2,523,296 | Harris | Sept. 26, 1950 |
| 2,568,543 | Goldsmith | Sept. 18, 1951 |
| 2,607,845 | Clark | Aug. 19, 1952 |
| 2,817,702 | Graham et al. | Dec. 24, 1957 |
| 2,885,463 | Rydz | May 5, 1959 |